April 28, 1925.  1,535,866
W. T. SEARS
CONTROLLING MECHANISM FOR MOTOR VEHICLES
Filed Jan. 7, 1922   2 Sheets-Sheet 1
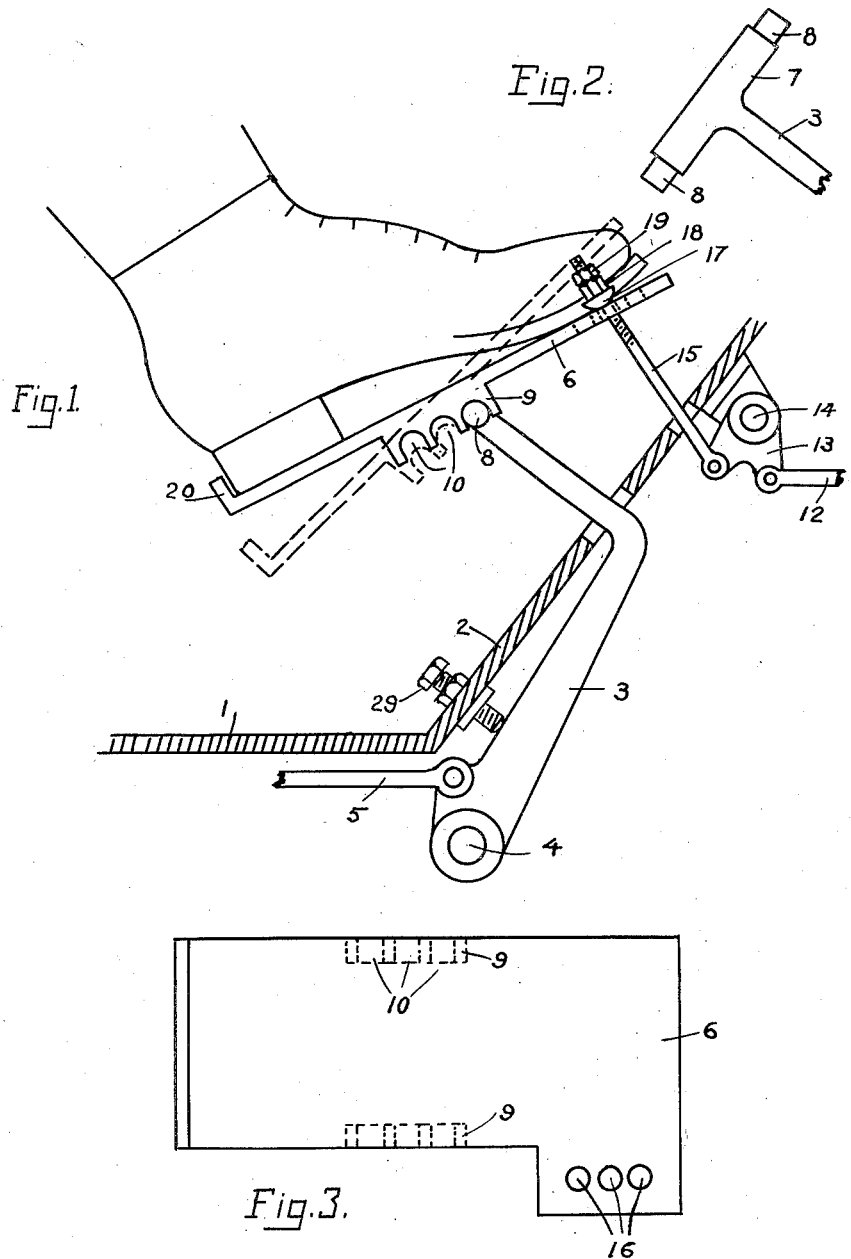

April 28, 1925.
W. T. SEARS
1,535,866
CONTROLLING MECHANISM FOR MOTOR VEHICLES
Filed Jan. 7, 1922    2 Sheets-Sheet 2
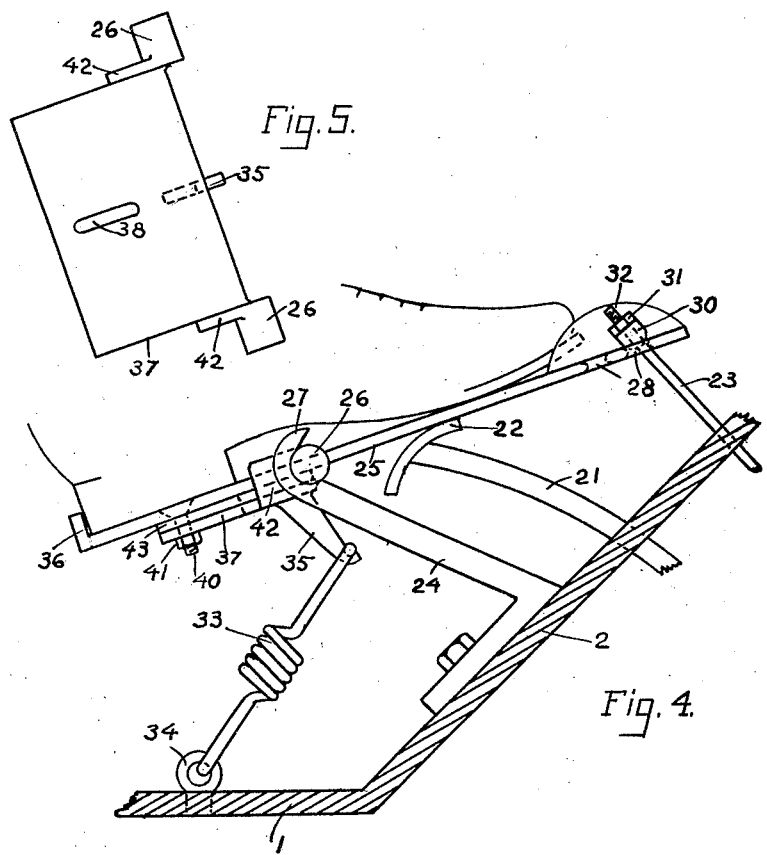
Inventor
Willard T. Sears
By his Attorney R. H. Strother Patented Apr. 28, 1925.

1,535,866

UNITED STATES PATENT OFFICE.

WILLARD T. SEARS, OF MONTCLAIR, NEW JERSEY; MABEL HELENA SEARS EXECUTRIX OF SAID WILLARD T. SEARS, DECEASED.

CONTROLLING MECHANISM FOR MOTOR VEHICLES.

Application filed January 7, 1922. Serial No. 527,597.

*To all whom it may concern:*

Be it known that I, WILLARD T. SEARS, a citizen of the United States, residing at Montclair, New Jersey, have invented certain new and useful Improvements in Controlling Mechanism for Motor Vehicles, of which the following is a specification.

My invention relates to controlling pedal mechanism such as is used in motor cars, and especially to such mechanism of the kind where a single pedal controls two functions such, for example, as the brake and the accelerator.

My invention has for its principal purpose to make certain improvements designed to increase the comfort of the driver and the ease and certainty of the operation of the mechanism, and to decrease the liability of accidents.

To the above and other ends which will hereinafter appear, my invention consists in certain features of construction and combinations and arrangements of parts, all of which will be fully set forth herein and particularly pointed out in the claims.

In the accompanying drawings:

Fig. 1 is a side elevation, partly in section, of a pedal mechanism, embodying my invention.

Fig. 2 is a fragmentary view of the upper end of the brake lever.

Fig. 3 is a top face view of the pedal.

Fig. 4 is a side elevation of a modification, and

Fig. 5 is a face view of a detail of Fig. 4.

Referring first to Figs. 1, 2 and 3, 1 represents the floor and 2 the footboard of an automobile. A brake lever 3 is pivoted at 4 and comes up through a suitable opening in the footboard. Said lever is connected with the brake by any suitable means including, for example, a link 5 pivoted to said lever and it is held in normal position by a suitable spring. The pedal 6 is mounted bodily on and is pivoted to the upper end of the brake lever 3. As shown in the present instance the brake lever 3 is provided at its upper end with a cross bar 7 terminating in reduced trunnions 8. The pedal 6 has two flanges 9 one at either side thereof about midway of the length of the pedal and each of said flanges has several open ended slots or semi circular recesses 10 in its under side, one in front of the other; and any desired right and left hand pair of these recesses can take a bearing on the trunnions 8 of the lever 3. The construction is such that the driver can very easily adjust the pedal front and back, from one pair of recesses to another to suit the length of his foot. In Fig. 1 the pedal is pivoted in the forwardmost one of the three pairs of recesses shown, this being the adjustment suitable for a long foot. A person with a very short foot would use the rearmost pair of recesses and other persons would use an intermediate pair of recesses. I have shown a pedal adapted for three adjustments but the number can, of course, be varied. By the means just described the pedal can be so adjusted on the brake lever that the driver's foot is balanced thereon, which not only adds greatly to his comfort but also improves the mechanism with relation to ease and certainty of operation.

The accelerator mechanism comprises a link 12 connected in any suitable manner with the throttle of the engine, said link being pivoted to one arm of an angled lever 13 fulcrumed at 14. The other arm of said lever has pivoted thereto a link 15 which passes through a suitable hole in the footboard 2 and is pivoted to the pedal 6. In the present instance, and preferably, the pedal 6 has a part offset laterally at one end and in said part there are a series of holes 16 at different distances from the pivotal axis of the pedal, and the rod 15 can be passed loosely through any desired one of these holes. Above the pedal said rod has thereon a hemispherical washer 17, an adjusting nut 18 and a locking nut 19, the upper end of the rod being threaded for a sufficient distance to allow for adjustment of said nuts and washer.

The parts are shown by full lines in normal position in Fig. 1. The construction is such that the accelerator action is obtained by tilting the pedal about its pivot 8 to the position shown in broken lines and the brake is applied by pushing the pedal down bodily, thus rocking the lever 3 about its pivot 4. The restoring spring for the lever 3 has a strength adapted to support the weight of the foot, but such as to yield to pressure intentionally applied to the pedal. When the brake is applied the whole pedal moves downward toward the footboard 2, sliding over the rod 15 which if it was already in its normal position remains there. Even if the pedal was tilted to hold the throttle open at the moment when pressure was applied to work the brake the bodily downward movement of the pedal would allow the rod 15 to move automatically to its normal position and close the throttle. It will be perceived that the operation of opening the throttle and that of applying the brake are done by different muscles and by entirely different leg and foot movements so that there is no danger of confusing the two actions and when the brake is applied it is impossible to work the accelerator. Said accelerator is worked by rocking the foot about the ankle whereas the brake is applied by straightening the leg at the hip and knee.

The series of holes 16 provides an adjustment of the rod 15 to regulate the leverage of the pedal on the accelerator connection. If the rod 15 is connected with the pedal at one of those holes nearest the pivot of the pedal it will require a greater amount of rocking of the pedal about its pivot to have a given effect on the throttle than if said rod is put in a hole more remote from the pivot. This rod can therefore be adjusted according to the preference of individual drivers in this regard. One driver may prefer to have the angle at which his foot rests when holding the throttle wide open not so very different from that which it occupies when the throttle is closed, and he would prefer to put the rod 15 near the end of the pedal. Another person might prefer the finer regulation of the throttle which could be obtained by putting the rod 15 nearer the pivot of the pedal so that a slight change in the angle of the pedal would result in only a slight adjustment of the throttle. Moreover, the position at which the rod 15 is pivoted to the pedal will also depend on the adjustment of the pedal front and back, that is to say, on which one of the recesses 10 is used. Other things being equal a driver having a long foot would probably set the rod 15 nearer to the end of the pedal than a person with a short foot.

Adjustment of the washer 17 and nuts 18 and 19 up and down the rod 15 will regulate the angle at which the pedal stands at the most ordinary driving speed. A driver can readily adjust this angle to suit his own comfort. In other words he can adjust it according to the natural and most comfortable position of his own foot when resting on the pedal. This, of course, would vary with different drivers. The brake lever 3 is usually made adjustable up and down to suit the length of the driver's leg, as, for example, by means of an adjusting stop screw 29, which limits the return motion of said lever by its spring. The nut 18 will also be adjusted in harmony with the adjustment of screw 29; that is to say, if the adjustment of screw 29 is changed the nut 18, etc. would be correspondingly adjusted so as to preserve the correct or desired angle of the pedal.

As shown in the drawing, the throttle is opened by depressing the heel and elevating the toe of the foot. Some drivers may prefer the opposite action, namely, that of depressing the toe to open the throttle. In order to bring about this mode of operation it is only necessary to move the lever 13 and rod 15 downward nearer to the floor 1 and to connect said rod 15 with the rear end of the pedal instead of the forward end as shown. In this instance the series of holes at that end of the pedal would afford the same adjustment as in the form shown in the drawing. It will be perceived that in the construction above described I provide a combination of adjustments whereby the driver can regulate the pedal to suit his individual requirements and ideas. The series of recesses 10 enable him to regulate the distance of the rear flange 20 from the pivot of the pedal, according to the length of his foot so that his foot is balanced on the pedal. The holes 16 enable him to regulate the amount of movement of the foot that is necessary to give a certain amount of throttle opening; and the nut 18 enables him to regulate the angle of the foot with the leg.

In Figs. 4 and 5 I have illustrated a modification of the invention especially adapted to cars that are already constructed and provided with the usual separate brake and accelerator pedals. This form of the invention resembles in some respects the pedal mechanism shown, described and claimed in my prior application for patent, filed February 2, 1921, Serial No. 441,796. In said figures, 1 is the floor and 2 the footboard of a car having a brake pedal or lever whose stem 21 comes up through the board 2 and carries a head 22, said pedal being so pivoted that when depressed it moves substantially in the arc in which its stem 21 is formed. I remove the accelerator pedal entirely, and connect the throttle with a rod 23 in such wise that to pull upward on said rod opens said throttle. A pair of brackets 24 are mounted on the footboard 2, a little back of and one at either side of the brake lever 21, 22; and a pedal 25 is mounted in said brackets and rests on the head 22 of the brake lever. Said pedal has two trunnions 26 pivoted in comparatively shallow, forwardly-facing recess in the upper ends of said brackets, each of which latter has a projecting part 27 to prevent said trunnions from accidentally sliding off of the ends of said brackets.

The rod 23 passes through one of several holes 28 near the forward end of the pedal, said holes being at different distances from the pivots 26, as in the first described form and for the same purpose. The rod 23 has on its upper end above the pedal a rounded washer 30 and an adjusting nut 31, these corresponding in structure and functioning with the washer 17 and nut 18 already described. I have shown a flange or rib 32, projecting from the upper surface of the pedal in position to keep the driver's foot out of contact with the rod 23, washer 30 and nut 31. The construction is such that the throttle can be opened to any desired extent by rocking the pedal about its pivots 26 as in the other form of the invention, and the brake can be applied by pushing the pedal bodily downward. In this last operation, the trunnions 26 are forced out of the depressions in which they had been seated and they slide down the rear faces of the bracket 24, which faces are preferably made approximately parallel to the line of motion of the head 22. This motion not only operates the brake lever but it also moves downward that part of the pedal to which the rod 23 is connected, thus closing the throttle if it was open before and making it impossible to open said throttle when applying the brake.

In order to hold the pedal in normal position and to restore it thereto after any operation of it, a tension spring 33 is connected at one end to a ring bolt 34 in the floor of the car, and at the other to an arm 35 projecting downward from the under side of the pedal. The line of force of this spring is such as to rock the pedal about its pivot to restore it to normal after operating the throttle, and also such as to slide the trunnions 26 up the brackets 24 and into their pivotal recesses after an operation of the brake; and said spring holds said trunnions in said recesses until they are forced out in operating the brake.

The two adjustments to regulate the leverage of the pedal on the rod 23 and to regulate the angle of the pedal, are effected by means of the holes 28 and the nut 31, respectively. In order to provide for the third adjustment, namely the balance of the foot on the pedal according to the length of said foot, the pedal itself is made in two parts, relatively adjustable. The upper or principal part of the pedal, to which the numeral 25 is directly applied in the drawing, has a flange 36 at its rear edge to locate the foot, and the trunnions 26 and arm 35 are attached to or are integral with the lower section 37. This, as here shown, consists of a flat plate having said trunnions and arms suitably projecting therefrom, and having a longitudinal slot 38; and a bolt 40 extends through the section 25 and through said slot and has a nut 41 thereon. The upper section of the pedal can be adjusted to any desired position front and back, and secured in adjusted position by tightening said nut.

The upper section 25 of the pedal may lie between two ears 42 upstanding from the section 37, and these and the bolt 40 together maintain the sections of the pedal in proper alignment; or this may be accomplished in any suitable way.

It will be perceived that in this form of the invention the same three adjustments are provided for as in the form first described.

An additional adjustment is also provided, namely, one to regulate the height of the pedal. This can be done by various means, but that shown in the drawing is very simple and convenient. It consists of a filler 43, interposed between the sections 37 and 25 so as to raise the latter to a higher level. This filler can be a simple plate of metal or other material of dimensions suitable for resting on the sections 37 and having a hole for the bolt 40; and it can be made of whatever thickness is required to give the desired elevation to the pedal. Some drivers would require no filler at all, and others fillers of different thicknesses, depending on the physical characteristics or the personal preference of the individual driver; but the thickness of filler required also depends on the car to which the mechanism is applied, it being recalled that this form of the invention is more especially intended for application to cars already constructed and in use. In applying the invention to such a car, account must be taken of the fact that the head 22 of the brake lever is a fixed point to which the pedal must be adapted; that is to say, said pedal, when in normal, non-accelerating position, should rest on or stand quite close to, said head. In order to bring this about and at the same time have the pedal stand normally at the desired angle, it may be necessary to regulate the height of said pedal by the means described or by equivalent means.

Various modifications may be made, other than those specifically described, without departing from my invention.

What I claim is:

1. The combination of a pedal having a fixed support allowing to said pedal a pivotal movement and a bodily movement, an accelerator connection operated by such pivotal movement, a brake lever standing in the path of the bodily movement of said pedal and means for adjusting the height of said pedal relative to its pivot to cause said pedal normally to stand in proper relation to said brake lever.

2. The combination of a pedal having a fixed support allowing to said pedal a pivotal movement and a bodily movement, an accelerator connection operated by such pivotal movement, a brake lever standing in the path of the bodily movement of said pedal; means adjustable to vary the angle of said pedal; and means for adjusting the height of said pedal relative to its pivot to cause said pedal normally to stand in proper relation to said brake lever and at the same time to stand at the desired angle.

3. The combination of a support fastened to a fixed part, a pedal having pivotal and bodily movement relative to said support, an accelerator connection operated by said pivotal movement, a brake lever standing in the path of said bodily movement, and means for adjusting the height of that portion of said lever where said lever is pivoted to enable a change to be made in the angle of said pedal while preserving its operative relation to said brake lever.

In testimony whereof, he has signed his name to this specification this 6th day of January 1922.

WILLARD T. SEARS.